US008966654B1

(12) United States Patent
Kwak

(10) Patent No.: US 8,966,654 B1
(45) Date of Patent: Feb. 24, 2015

(54) PRIVACY CONTROL-ADJUSTABLE VEHICLE MONITORING SYSTEM WITH A WILD CARD MODE

(71) Applicant: TrueLite Trace, Inc., Cupertino, CA (US)

(72) Inventor: Sung Bok Kwak, Cupertino, CA (US)

(73) Assignee: Truelite Trace, Inc., Cupertino, CA (US)

( * ) Notice: Subject to any disclaimer, the term of this patent is extended or adjusted under 35 U.S.C. 154(b) by 8 days.

(21) Appl. No.: 13/968,109

(22) Filed: Aug. 15, 2013

(51) Int. Cl.
*G06F 7/04* (2006.01)
*G06F 21/60* (2013.01)

(52) U.S. Cl.
CPC ..................................... *G06F 21/60* (2013.01)
USPC ................ 726/28; 701/119; 701/21; 340/439

(58) Field of Classification Search
None
See application file for complete search history.

(56) References Cited

U.S. PATENT DOCUMENTS

| | | | |
|---|---|---|---|
| 6,141,610 A | 10/2000 | Rothert et al. | |
| 6,819,236 B2 | 11/2004 | Kawai et al. | |
| 6,894,606 B2 | 5/2005 | Forbes et al. | |
| 8,032,277 B2 * | 10/2011 | Larschan et al. | 701/32.4 |
| 8,577,703 B2 * | 11/2013 | McClellan et al. | 705/7.11 |
| 8,630,768 B2 * | 1/2014 | McClellan et al. | 701/36 |
| 8,700,255 B2 * | 4/2014 | Joseph | 701/34.4 |
| 2006/0235960 A1 * | 10/2006 | Lai et al. | 709/224 |
| 2008/0319602 A1 * | 12/2008 | McClellan et al. | 701/33 |
| 2010/0087984 A1 * | 4/2010 | Joseph | 701/33 |
| 2012/0161952 A1 | 6/2012 | We et al. | |
| 2013/0145482 A1 * | 6/2013 | Ricci et al. | 726/28 |
| 2013/0151588 A1 * | 6/2013 | Basir | 709/203 |
| 2013/0198802 A1 * | 8/2013 | Ricci | 726/1 |

* cited by examiner

*Primary Examiner* — Fikremariam A Yalew
(74) *Attorney, Agent, or Firm* — Invent Capture, LLC.; Samuel S. Cho

(57) ABSTRACT

A novel privacy control-adjustable vehicle monitoring system and a related method of operation provide a dynamically-adjustable access grant or denial of privacy-sensitive vehicle information to a vehicle monitoring personnel based on a driver's response to an electronic request made by the vehicle monitoring personnel. In one embodiment, vehicle information is categorized into a mandatory disclosure dataset and a privacy-adjustable dataset, wherein the mandatory disclosure dataset is disclosed to the vehicle monitoring personnel at all times, while the privacy-adjustable dataset is accessible if the driver grants access via a driver's user interface on an onboard vehicle user interface, or on a mobile electronic device. Furthermore, a special wild card mode visible to the driver enables the vehicle monitoring personnel to access an entire set of vehicle information for a limited period per access and for a limited number of accesses per period, based on a pre-arranged consent with the driver.

19 Claims, 7 Drawing Sheets

A Method of Wild Card Mode Operation Between a Vehicle Monitoring Personnel and a Driver's User Interface An Embodiment of a Privacy Control-Adjustable Vehicle Monitoring System with a Wild Card Mode

400

A Block Diagram Example for a Privacy Control-Adjustable Onboard Vehicle Monitoring Device with a Wild Card Mode

500

A Method of Wild Card Mode Operation Between a Vehicle Monitoring Personnel and a Driver's User Interface

700

PRIVACY CONTROL-ADJUSTABLE VEHICLE MONITORING SYSTEM WITH A WILD CARD MODE

BACKGROUND OF THE INVENTION

The present invention generally relates to vehicle monitoring and vehicle information management methods and systems. More specifically, various embodiments of the present invention relate to a privacy control-adjustable vehicle monitoring system with a wild card mode.

Vehicle monitoring systems for commercial vehicle drivers as well as passenger vehicle drivers are becoming increasingly ubiquitous. For example, OnStar systems offer cellular signal and satellite signal-based vehicle monitoring and communications between an onboard transceiver device in a vehicle and a vehicle monitoring station. Emergency location tracking of the vehicle, emergency vehicle door unlocks, and subscription fee-based voice navigational guidance via the onboard transceiver device and the vehicle monitoring station are some of the conventional offerings from the OnStar systems and other vehicle-tracking service providers.

Furthermore, parents, commercial vehicle business owners, and other supervisory entities are also becoming more interested in monitoring their vehicles using a computer interface. For example, parents may want to check whereabouts, driving habits, and vehicle safety profiles of their adolescent children by using a computer program executed on a notebook computer that remotely monitors certain data fields and parameters recorded and collected by an onboard vehicle monitoring device. In another example, a supervising entity in a commercial trucking business or a limousine fleet business may want to check whereabouts, driving habits, and vehicle safety profiles of their hired commercial vehicle drivers.

However, some drivers find that the notion that a vehicle-monitoring entity keeps track of what can be considered private and sensitive information, such as the vehicle's speed, the vehicle's past and current locations categorized by time, and other privacy-sensitive information, is a serious violation of civil rights and privacy, as such privacy-sensitive information can be hacked, sold, stolen, or misused by governmental authorities, supervising entities, and even rogue entities. The concern for such privacy violation of drivers is significant in today's vehicle electronic systems, regardless of which the vehicle-monitoring entity is associated with a particular driver (e.g. a monitoring service provider such as OnStar, an employer, parents, or a combination thereof).

The existing solution for avoiding such outright or potential privacy violations is either avoiding vehicles equipped with onboard vehicle monitoring devices, or disabling the onboard vehicle monitoring devices entirely. While service providers (e.g. OnStar) and supervising entities (e.g. employers, parents, and etc.) for onboard vehicle monitoring devices often officially state that all of the sensitive information gathered in real-time by the service providers of onboard vehicle monitoring will remain private and protected, a gross misuse or a leak of privacy-sensitive data to a third party entity over the operational lifecycle of the vehicle is a serious civil rights risk to each driver.

Therefore, it may be desirable to devise a novel privacy control-adjustable vehicle monitoring system that involves an explicit real-time consent from a driver to a vehicle monitoring personnel or a supervising entity to grant or deny access to certain types of datasets collected in an onboard vehicle monitoring device. In addition, it may be desirable to provide a novel dataset categorization for vehicle monitoring systems to separate a "must-disclose" mandatory dataset from a privacy-adjustable dataset for various data fields collected by the onboard vehicle monitoring device for the driver's privacy protection.

Furthermore, it may be desirable to provide one or more flexible user interfaces that enable a driver to grant or deny access to privacy-adjustable datasets whether the driver is currently inside or outside the vehicle. Moreover, it may be also desirable to provide a novel wild card mode that grants a vehicle monitoring personnel or a supervising entity a time-limited and frequency-limited access to currently-private datasets based on an explicit pre-arranged agreement with a driver.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a privacy control-adjustable vehicle monitoring system with a wild card mode is disclosed. This privacy control-adjustable vehicle monitoring system comprises: a privacy control-adjustable onboard vehicle monitoring device capable of storing a vehicle information dataset collected from a vehicle's onboard computer or another vehicle-attached equipment; a computer server with a CPU and a memory unit, wherein the computer server is operated by a vehicle monitoring personnel; a vehicle monitoring software module at least partially executed on the CPU and the memory unit of the computer server operated by the vehicle monitoring personnel, wherein the vehicle monitoring software module includes a mandatory disclosure dataset monitoring sub-module, a privacy-adjustable dataset monitoring sub-module, a privacy-adjustable dataset access request sub-module, and a wild card information sub-module; a wireless transceiver unit either integrated into or operatively connected to the privacy control-adjustable onboard vehicle monitoring device for transmission of at least a portion of the vehicle information dataset from the privacy control-adjustable onboard vehicle monitoring device to the computer server operated by the vehicle monitoring personnel; the vehicle information dataset comprising a mandatory disclosure dataset that includes wild card information, and a privacy-adjustable dataset, wherein the mandatory disclosure dataset is automatically and periodically transmitted to the computer server operated by the vehicle monitoring personnel, and wherein the privacy-adjustable dataset is not transmitted to the computer server, unless the privacy-adjustable dataset is currently flagged by a driver to grant access to the vehicle monitoring personnel; and a driver's user interface device configured to receive, grant, or deny a privacy-adjustable data access request by the computer server operated by the vehicle monitoring personnel.

In another embodiment of the invention, a method of operating a privacy control-adjustable vehicle monitoring system for a particular privacy control adjustment in a vehicle is disclosed. This method comprises steps of: transmitting a permission request from a computer server operated by a vehicle monitoring personnel to a driver's user interface device for requesting access to a private data field in a privacy-adjustable dataset of a vehicle information dataset, wherein the permission request is transmitted by a wireless data network; granting or denying the permission request using the driver's user interface device, which wirelessly transmits a response signal to the computer server via the wireless data network for granting or denying access to the private data field; receiving the response signal in the computer server operated by the vehicle monitoring personnel; and if the response signal grants the access to the private data field: changing a data access flag for the private data field to additional monitoring allowed; and accessing the private data field, which is now allowed for additional monitoring by the computer server operated by the vehicle monitoring personnel; else if the response signal denies the access to the private data field: keeping the private data field private from information access by the computer server operated by the vehicle monitoring personnel.

Furthermore, in another embodiment of the invention, a method of operating a wild card mode in a privacy control-adjustable vehicle monitoring system between a vehicle monitoring personnel's computer server and a driver's user interface device is disclosed. This method comprises steps of: selecting a number of allowed wild card usage and a duration of each wild card usage for the wild card mode as an electronic consent with the vehicle monitoring personnel's computer server from the driver's user interface device, wherein the wild card mode temporarily allows the vehicle monitoring personnel's computer server to bypass driver-specific privacy settings to access all of a vehicle information dataset, including a mandatory disclosure dataset and a privacy-adjustable dataset, from a privacy control-adjustable onboard vehicle monitoring device; if the wild card mode is activated by the vehicle monitoring personnel's computer server in accordance with the electronic consent: opening most or all of private data fields in the privacy-adjustable dataset in the privacy control-adjustable onboard vehicle monitoring device to real-time monitoring by the vehicle monitoring personnel's computer server; updating the number of allowed wild card usage and the duration of each wild card usage for the wild card mode; and informing the driver's user interface device that the wild card mode is currently activated; else if the wild card mode is not activated due to restrictions associated with the electronic consent: disabling real-time monitoring of any private data fields by the vehicle monitoring personnel's computer server.

DETAILED DESCRIPTION

Figure 1:
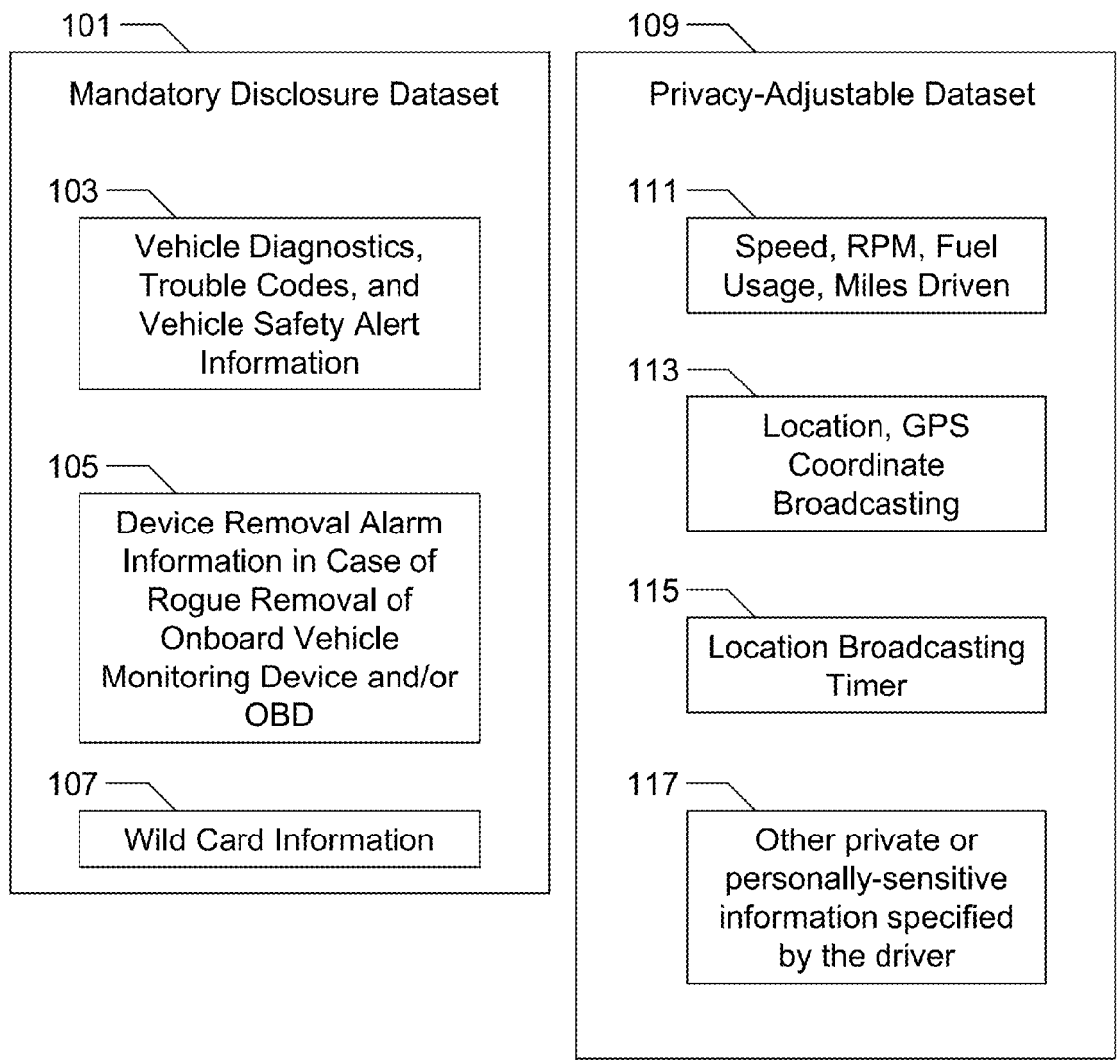
FIG. 1 shows a novel separation of a mandatory disclosure dataset and a privacy-adjustable dataset in vehicle monitoring systems, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more privacy control-adjustable vehicle monitoring systems with a wild card mode, or methods of operating such novel systems. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "onboard vehicle monitoring device" is defined as an electronic device installed in a vehicle to collect and/or analyze a variety of vehicle-related data. In one example, a vehicle's onboard computer outputs many data parameters in real-time, such as vehicle diagnostic information (e.g. engine temperature, oil level, OBD codes, and etc.), speed information, engine rotation-per-minute (RPM) information, fuel levels, and miles driven relative to time. These data parameters can be part of the vehicle-related data collected and analyzed by an onboard vehicle monitoring device. Furthermore, the onboard vehicle monitoring device may also act as a "vehicle black box" to collect and record multimedia information associated with a particular vehicle, such as video and/or audio footage of the vehicle's interior or exterior, if the onboard vehicle monitoring device is connected to a camera and/or a microphone in the particular vehicle. Preferably, the information collected and recorded from the onboard vehicle monitoring device is wirelessly transmitted to a vehicle monitoring station or a supervising entity's computer server for monitoring, alert, and additional analysis. A privacy control-adjustable onboard vehicle monitoring device in accordance with an embodiment of the invention is an example of an onboard vehicle monitoring device.

Furthermore, a term "vehicle monitoring system" refers to a networked electronic and data communication infrastructure and computerized user interface devices among vehicles, a vehicle monitoring station, and/or a supervising entity of vehicles. For example, a privacy control-adjustable vehicle monitoring system in accordance with an embodiment of the invention may include a privacy control-adjustable onboard vehicle monitoring device installed in a vehicle, a wireless transceiver either integrated with or operatively connected to the privacy control-adjustable onboard vehicle monitoring device, a cellular base station, a GPS satellite, a computer server for a supervising entity or a vehicle monitoring personnel, and a computerized interface for the supervising entity or the vehicle monitoring personnel.

In addition, for the purpose of describing the invention, a term "driver's user interface" is defined as a computerized user interface operating in an electronic device, which is configured to enable a driver to grant or deny access to certain datasets collected by a privacy control-adjustable onboard vehicle monitoring device by a supervising entity or a vehicle monitoring personnel.

Furthermore, for the purpose of describing the invention, a term "vehicle monitoring personnel" is defined as a monitoring service provider's employee (e.g. an OnStar employee) for monitoring vehicle activities and driving behaviors, or a supervising entity that monitors vehicle activities and driving behaviors. Examples of supervising entities include, but are not limited to, commercial vehicle operators' employees responsible for monitoring fleet vehicles, parents monitoring their teenage children's vehicle activities and driving behaviors, and children of elderly parents monitoring the elderly parents' vehicle activities and driving behaviors.

In addition, for the purpose of describing the invention, a term "computer server" is defined as a physical computer system, another hardware device, a software module executed in an electronic device, or a combination thereof. For example, in context of an embodiment of the invention, a "computer server" is dedicated to executing one or more computer programs for receiving, processing, analyzing, and/ or monitoring data from a privacy control-adjustable onboard vehicle monitoring device. Furthermore, in one embodiment of the invention, a computer server is connected to one or more data networks, such as a local area network (LAN), a wide area network (WAN), a cellular network, and the Internet. Moreover, a computer server can be used by a vehicle monitoring personnel for gathering and analyzing data from one or more privacy control-adjustable onboard vehicle monitoring devices, which are installed in one or more monitored vehicles.

One aspect of an embodiment of the present invention is providing a novel privacy control-adjustable vehicle monitoring system that involves an explicit real-time consent from a driver to a vehicle monitoring personnel or a supervising entity to grant or deny access to certain types of datasets collected in an onboard vehicle monitoring device.

Another aspect of an embodiment of the present invention is providing a novel dataset categorization for vehicle monitoring systems to separate a "must-disclose" mandatory dataset from a privacy-adjustable dataset for various data fields collected by the onboard vehicle monitoring device for the driver's privacy protection.

Yet another aspect of an embodiment of the present invention is providing one or more flexible user interfaces that enable a driver to grant or deny access to privacy-adjustable datasets whether the driver is currently inside or outside the vehicle.

Furthermore, another aspect of an embodiment of the present invention is providing a novel wild card mode that grants a vehicle monitoring personnel or a supervising entity a time-limited and frequency-limited access to currently-private datasets based on an explicit pre-arranged agreement with a driver.

In addition, another aspect of an embodiment of the present invention is providing a method of operating a novel privacy control-adjustable vehicle monitoring system with a wild card mode, in accordance with an embodiment of the invention.

FIG. 1 shows a novel separation (100) of a mandatory disclosure dataset (101) and a privacy-adjustable dataset (109) in a privacy control-adjustable vehicle monitoring system, in accordance with an embodiment of the invention. In a preferred embodiment of the invention, the mandatory disclosure dataset (101) and the privacy-adjustable dataset (109) are both part of a vehicle information dataset which is collected and stored by a privacy control-adjustable onboard vehicle monitoring device in a vehicle.

In case of the mandatory disclosure dataset (101), all data fields within the mandatory disclosure dataset (101) is periodically and wirelessly transmitted from the privacy control-adjustable onboard vehicle monitoring device to a computer server operated by a vehicle monitoring personnel. Depending on a particular application of the privacy control-adjustable vehicle monitoring system, the vehicle monitoring personnel may be a vehicle monitoring service provider's employee for a subscription fee-paying driver, a commercial vehicle or fleet employer to its deployed vehicles, or a family member monitoring other family members' vehicle information and driving behaviors.

As shown in FIG. 1, in the preferred embodiment of the invention, the mandatory disclosure dataset (101) comprises a first sub-dataset comprising vehicle diagnostics, trouble codes, and vehicle safety alert information (103), a second sub-dataset comprising device removal alarm information in case of rouge removal of an onboard vehicle monitoring device and/or an onboard device (OBD) (105), and a third sub-dataset comprising wild card information (107). For example, in context of the preferred embodiment of the invention, transmission of data related to an engine malfunction trouble code, a brake failure warning alert, or a crash detection alert from the onboard vehicle monitoring device and/or the OBD to the computer server operated by the vehicle monitoring personnel is mandatory. A driver in a vehicle equipped with the privacy control-adjustable onboard vehicle monitoring device cannot disable or turn off the automated and periodic transmission of sub-datasets (e.g. 103, 105, 107) in the mandatory disclosure dataset, because the information contained in the mandatory disclosure dataset is deemed too critical not to be disclosed to the vehicle monitoring personnel at all times.

In another embodiment of the invention, the mandatory disclosure dataset (101) may include other data or exclude one or more of the sub-datasets (103, 105, 107) listed in the preferred embodiment of the invention, depending on particular needs of vehicle monitoring.

Continuing with FIG. 1, the privacy-adjustable dataset (109) is also part of the vehicle information dataset. In the preferred embodiment of the invention, the privacy-adjustable dataset (109) is a collection of sub-datasets, such as a first sub-dataset comprising speed, engine rotations per minute (RPM), fuel usage, miles driven (111), a second sub-dataset comprising location and GPS coordinate broadcasting (113), a third sub-dataset comprising a location broadcasting timer (115), and a fourth sub-dataset comprising other private or personally-sensitive information (117) specified by the driver. Examples of other private or personally-sensitive information (117) include, but are not limited to, video information recorded from a dashboard-mounted camera, audio information recorded from a microphone in the vehicle, music preferences and listening history from the vehicle's audio system, and Internet search history using an onboard Internet user interface. Unlike the mandatory disclosure dataset (101), the privacy-adjustable dataset (109) is generally not disclosed to or accessible by the computer server operated by the vehicle monitoring personnel, unless the driver grants access to the vehicle monitoring personnel.

This novel aspect of the present invention is particularly useful if the driver believes that certain types of information collected and stored by the privacy control-adjustable onboard vehicle monitoring device is too personal and private to qualify as a mandatory disclosure to the vehicle monitoring personnel in real time. For example, the driver may find that his vehicle's particular speed (i.e. 111), his journey history in form of location and GPS coordinate broadcasting (i.e. 113), or a visual feed recorded by a dashboard mounted camera (i.e. 117), is too personal and private to disclose to the vehicle monitoring personnel. Therefore, in one or more embodiments of the invention, these sub-datasets (111, 113, 115, 117) are contained in the privacy-adjustable dataset, wherein each sub-dataset and any data field within each sub-dataset can be individually flagged as "private" (i.e. not accessible by computer server operated by the monitoring personnel) or "monitoring allowed" (i.e. available for remote vehicle data monitoring).

Furthermore, in one embodiment of the invention, a particular time slot for the location and GPS coordinate broadcasting (113) may be configured using the location broadcasting timer (115). The location broadcasting timer (115) is particularly useful if the driver is driving a company vehicle or a commercial vehicle, in which his or her employer requires disclosure of the vehicle location during business hours. The location broadcasting timer (115) can enable the location and GPS coordinate broadcasting to the driver's supervising entity only during the pre-selected hours (e.g. 8 am~6 pm, Monday~Friday), so that the location and GPS coordinate broadcasting (113) is only active during those pre-selected hours, while automatically being disabled during the non pre-selected hours, such as weekends or off-days.

In the preferred embodiment of the invention, the wild card information (107) includes an electronic consent between the driver and the vehicle monitoring personnel regarding the number and the frequency of allowed wild card mode usages per specific time period. A "wild card mode," in context of various embodiments of the present invention, is a unique and consensual driver privacy setting-override mode that enables the computer server operated by the vehicle monitoring personnel to check all of the vehicle information dataset, including both the mandatory disclosure dataset (101) and the privacy-adjustable dataset (109). For example, if the driver consented to allowing two "wild card modes" per month, with each wild card mode lasting up to ten minutes for data access to the privacy-adjustable dataset (109) stored in the privacy control-adjustable onboard vehicle monitoring device, then the computer server operated by the vehicle monitoring personnel is authorized to access the privacy-adjustable dataset (109) on a real-time basis or on a periodic download basis, up to twice a month and only for ten minutes per wild card mode operation. Furthermore, the driver will be alerted that the wild card mode is activated via a driver's user interface device (e.g. an onboard vehicle user interface, a mobile electronic device, a notebook computer), if the vehicle monitoring personnel activates the wild card mode. Preferably, the wild card mode-related alerts can be transmitted and received in form of mobile application-based alerts, vehicle device alerts, emails, or text messages, which are presented by the driver's user interface device.

The wild card mode in accordance with various embodiments of the invention is devised as a balanced compromise between a driver's desire for some privacy and a vehicle monitoring personnel's need for a robust analysis and monitoring of vehicles for safety, business efficiency, and legal compliance. The terms of the wild card mode, such as the number of allowed wild card accesses per month and the duration of each wild card mode-based access, can be dynamically adjusted between the driver and the vehicle monitoring personnel by adjusting the wild card information (107) based on the electronic consent between the driver and the vehicle monitoring personnel.

Figure 2:
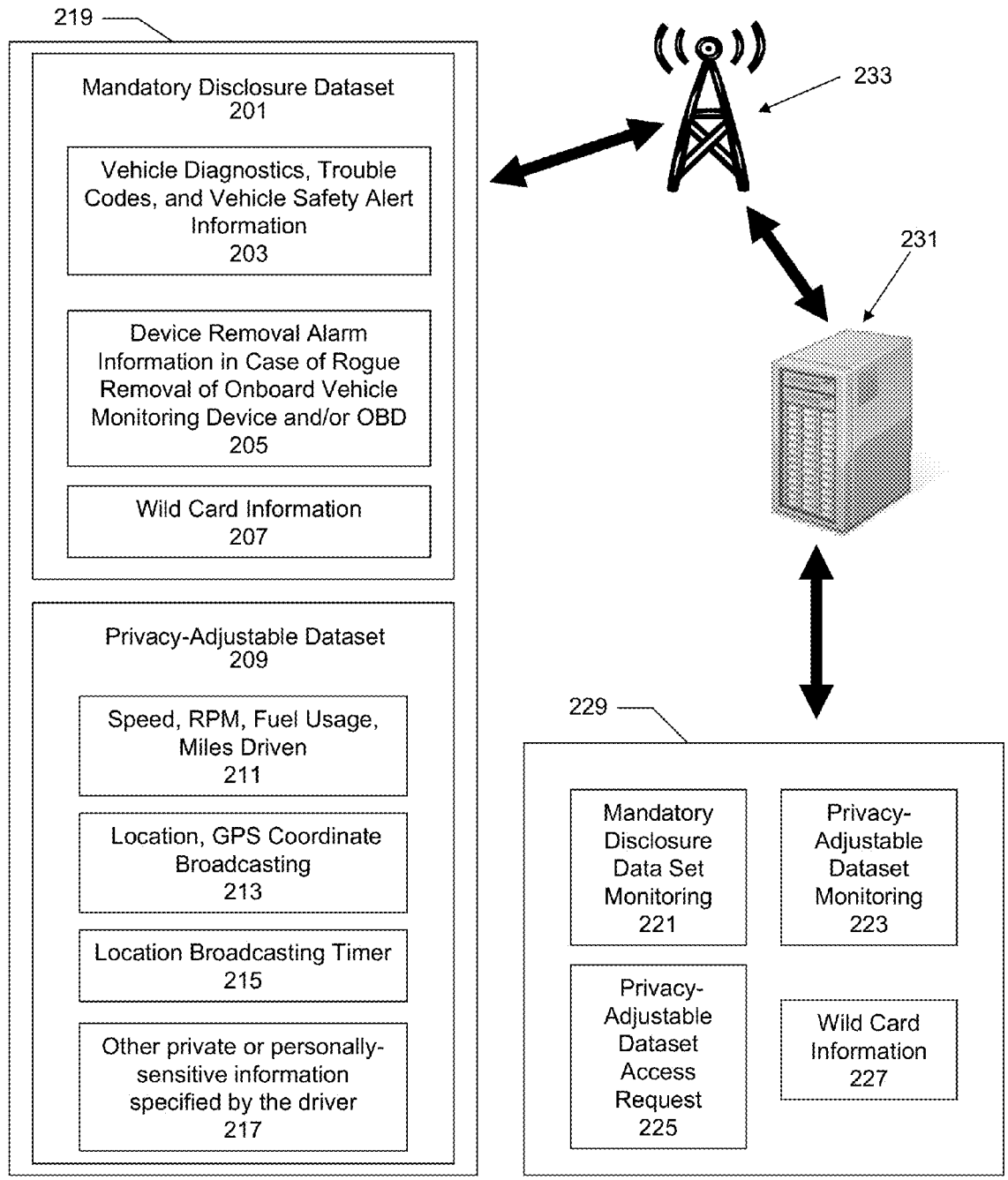
FIG. 2 shows a dataflow of a mandatory disclosure dataset and a privacy-adjustable dataset collected in an onboard vehicle monitoring device to a vehicle monitoring station's computer server operated by a vehicle monitoring personnel, in accordance with an embodiment of the invention.

FIG. 2 shows a dataflow (200) of a mandatory disclosure dataset (201) and a privacy-adjustable dataset (209) collected in an onboard vehicle monitoring device to a vehicle monitoring station's computer server (231), which is operated by a vehicle monitoring personnel, in accordance with an embodiment of the invention. In a preferred embodiment of the invention, the mandatory disclosure dataset (201) and the privacy-adjustable dataset (209) are part of the vehicle information dataset (219), which is collected and stored by a privacy control-adjustable onboard vehicle monitoring device in a vehicle.

In case of the mandatory disclosure dataset (201), all data fields within the mandatory disclosure dataset (201) is periodically and wirelessly transmitted from the privacy control-adjustable onboard vehicle monitoring device to a computer server (231) operated by a vehicle monitoring personnel. Depending on a particular application of the privacy control-adjustable vehicle monitoring system, the vehicle monitoring personnel may be a vehicle monitoring service provider's employee for a subscription fee-paying driver, a commercial vehicle or fleet employer to its deployed vehicles, or a family member monitoring other family members' vehicle information and driving behaviors.

As shown in FIG. 2, in the preferred embodiment of the invention, the mandatory disclosure dataset (201) comprises a first sub-dataset comprising vehicle diagnostics, trouble codes, and vehicle safety alert information (203), a second sub-dataset comprising device removal alarm information in case of rouge removal of an onboard vehicle monitoring device and/or an onboard device (OBD) (205), and a third sub-dataset comprising wild card information (207). For example, in context of this embodiment of the invention, transmission of data related to an engine malfunction trouble code, a brake failure warning alert, or a crash detection alert from the onboard vehicle monitoring device and/or the OBD to the computer server (231) operated by the vehicle monitoring personnel is mandatory. A driver in a vehicle equipped with the privacy control-adjustable onboard vehicle monitoring device cannot disable or turn off the automated and periodic transmission of sub-datasets (e.g. 203, 205, 207) in the mandatory disclosure dataset, because the information contained in the mandatory disclosure dataset is deemed too critical not to be disclosed to the vehicle monitoring personnel at all times. In another embodiment of the invention, the mandatory disclosure dataset (201) may include other data or exclude one or more of the sub-datasets (203, 205, 207) listed in the preferred embodiment of the invention, depending on particular needs of vehicle monitoring.

Continuing with FIG. 2, the privacy-adjustable dataset (209) is also part of the vehicle information dataset (219), and is periodically or continuously collected, stored, and/or recorded by the privacy control-adjustable onboard vehicle monitoring device. In the preferred embodiment of the invention, the privacy-adjustable dataset (209) is a collection of sub-datasets, such as a first sub-dataset comprising speed, engine rotations per minute (RPM), fuel usage, miles driven (211), a second sub-dataset comprising location and GPS coordinate broadcasting (213), a third sub-dataset comprising a location broadcasting timer (215), and a fourth sub-dataset comprising other private or personally-sensitive information (217) specified by the driver. Examples of other private or personally-sensitive information (217) include, but are not limited to, video information recorded from a dashboard-mounted camera, audio information recorded from a microphone in the vehicle, music preferences and listening history from the vehicle's audio system, and Internet search history using an onboard Internet user interface. Unlike the mandatory disclosure dataset (201), the privacy-adjustable dataset (209) is generally not disclosed to or accessible by the computer server (231) operated by the vehicle monitoring personnel, unless the driver grants access to the vehicle monitoring personnel.

This novel aspect of the present invention is particularly useful if the driver believes that certain types of information collected and stored by the privacy control-adjustable onboard vehicle monitoring device is too personal and private to qualify as a mandatory disclosure to the vehicle monitoring personnel in real time. For example, the driver may find that his vehicle's particular speed (i.e. 211), his journey history in form of location and GPS coordinate broadcasting (i.e. 213), or a visual feed recorded by a dashboard mounted camera (i.e. 217), is too personal and private to disclose to the vehicle monitoring personnel. Therefore, in one or more embodiments of the invention, these sub-datasets (211, 213, 215, 217) are contained in the privacy-adjustable dataset, wherein each sub-dataset and any data field within each sub-dataset can be individually flagged as "private" (i.e. not accessible by computer server (231) operated by the monitoring personnel) or "monitoring allowed" (i.e. available for remote vehicle data monitoring).

Furthermore, in one embodiment of the invention, a particular time slot for the location and GPS coordinate broadcasting (213) may be configured using the location broadcasting timer (215). The location broadcasting timer (215) is particularly useful if the driver is driving a company vehicle or a commercial vehicle, in which his or her employer requires disclosure of the vehicle location during business hours. The location broadcasting timer (215) can enable the location and GPS coordinate broadcasting to the driver's supervising entity only during the pre-selected hours (e.g. 8 am~6 pm, Monday~Friday), so that the location and GPS coordinate broadcasting (213) is only active during those pre-selected hours, while automatically being disabled during the non pre-selected hours, such as weekends or off-days.

In the preferred embodiment of the invention, the wild card information (207) categorized within the mandatory disclosure dataset (201) includes an electronic consent between the driver and the vehicle monitoring personnel regarding the number and the frequency of allowed wild card mode usages per specific time period. A "wild card mode," in context of various embodiments of the present invention, is a unique and consensual driver privacy setting-override mode that enables the computer server (231) operated by the vehicle monitoring personnel to check all of the vehicle information dataset, including both the mandatory disclosure dataset (201) and the privacy-adjustable dataset (209). For example, if the driver consented to allowing four "wild card modes" per month, with each wild card mode lasting up to five minutes for data access to the privacy-adjustable dataset (209) stored in the privacy control-adjustable onboard vehicle monitoring device, then the computer server (231) operated by the vehicle monitoring personnel is authorized to access the privacy-adjustable dataset (209) on a real-time basis or on a periodic download basis, up to four times a month and only for five minutes per wild card mode operation. Furthermore, the driver will be alerted that the wild card mode is activated via a driver's user interface device (e.g. an onboard vehicle user interface, a mobile electronic device, a notebook computer), if the vehicle monitoring personnel activates the wild card mode. Preferably, the wild card mode-related alerts can be transmitted and received in form of mobile application-based alerts, vehicle device alerts, emails, or text messages, which are presented by the driver's user interface device.

The wild card mode in accordance with various embodiments of the invention is devised as a balanced compromise between a driver's desire for some privacy and a vehicle monitoring personnel's need for a robust analysis and monitoring of vehicles for safety, business efficiency, and legal compliance. The terms of the wild card mode, such as the number of allowed wild card accesses per month and the duration of each wild card mode-based access, can be dynamically adjusted between the driver and the vehicle monitoring personnel by adjusting the wild card information (207) based on the electronic consent between the driver and the vehicle monitoring personnel.

Continuing with FIG. 2, in the preferred embodiment of the invention, the dataflow (200) of the vehicle information dataset (219) stored in the privacy control-adjustable onboard vehicle monitoring device is transmitted to the computer server (231) of the vehicle monitoring personnel by a wireless data network (233). Examples of the wireless data network (233) which may be utilized for the purpose of transmitting the vehicle information dataset (219) may include, but are not limited to, a cellular communication network, a satellite communication network, a wireless local area network (LAN), or a combination thereof.

Furthermore, as shown in FIG. 2, the computer server (231) of the vehicle monitoring personnel executes a vehicle monitoring software module (229) in its CPU and its memory unit. In the preferred embodiment of the invention, the vehicle monitoring software module (229) comprises a mandatory disclosure dataset monitoring sub-module (221), a privacy-adjustable dataset monitoring sub-module (223), a privacy-adjustable dataset access request sub-module (225), and a wild card information sub-module.

The mandatory disclosure dataset monitoring sub-module (221) is generally capable of analyzing a variety of data fields and sub-datasets associated with the mandatory disclosure dataset (201) transmitted from each monitored vehicle for the purpose of deducing useful alerts or useful information. For example, the mandatory disclosure data set monitoring module (221) can monitor a vehicle's engine temperature in real time remotely, and generate a safety alert to the vehicle monitoring personnel if an engine overheat condition is detected. The vehicle monitoring personnel then may call or message the driver or another responsible party to rectify the safety-related situation as efficiently as possible.

Furthermore, the privacy-adjustable dataset monitoring sub-module (223) is generally capable of analyzing a variety of data fields and sub-datasets associated with the privacy-adjustable dataset (209) to deduce useful alerts or useful information, but only if the driver allowed access to the privacy-adjustable dataset (209) locally stored in the privacy control-adjustable onboard vehicle monitoring device. If the driver has not granted access to a particular sub-dataset in the privacy-adjustable dataset (209), the privacy-adjustable dataset monitoring sub-module (223) is unable to retrieve data from the particular sub-dataset, but may be able to retrieve data from other sub-datasets of the privacy-adjustable datasets (209), if the privacy flag setting allows access. For example, the driver may allow access to the location and GPS coordinate broadcasting (213), but deny access to the speed, RPM, fuel usage, and miles driven (211) in the privacy-adjustable dataset (209).

In the preferred embodiment of the invention, by using the privacy-adjustable dataset access request sub-module (225), the vehicle monitoring personnel is able to send a permission request to the driver's user interface device to receive an authorization (i.e. in form of a response signal) from the driver to access private data fields or private sub-datasets within the privacy-adjustable dataset (209). In one embodiment of the invention, this permission request is sent electronically via the wireless data network (233). Upon receiving the permission request in the driver's user interface device, the driver may grant or deny the permission request to allow or prevent access to the private data fields and private sub-datasets within the privacy-adjustable dataset (209) by sending a response signal to the computer server (231) operated by the vehicle monitoring personnel.

In one example, if the response signal grants the access to the private data field, then the computer server (231) changes a data access flag for the private data field to "monitoring allowed," and initiates data access to the private data field. If the response signal denies the access to the private data field, then the computer server (231) is unable to access the private data field from the privacy-adjustable dataset (209) stored in the privacy-control adjustable onboard vehicle monitoring device.

However, if a wild card mode is activated by the vehicle monitoring personnel's computer server (231) in accordance with the electronic consent with the driver and in accordance with the wild card information (207, 227) that specifies the number of allowed wild card modes and the duration of each wild card mode per time interval (e.g. weekly, monthly, yearly, and etc.), then all of the vehicle information dataset (219) may be temporarily available for analysis by the vehicle monitoring software module (229). In general, the wild card mode may be activated in case of emergency or in case of a dire need to access vehicle-related information for safety, legal compliance, or business operational efficiencies. Preferably, the driver's user interface device informs the driver in real time that the wild card mode is currently active as a privacy alert, if the vehicle monitoring personnel activates the wild card mode.

Figure 3:
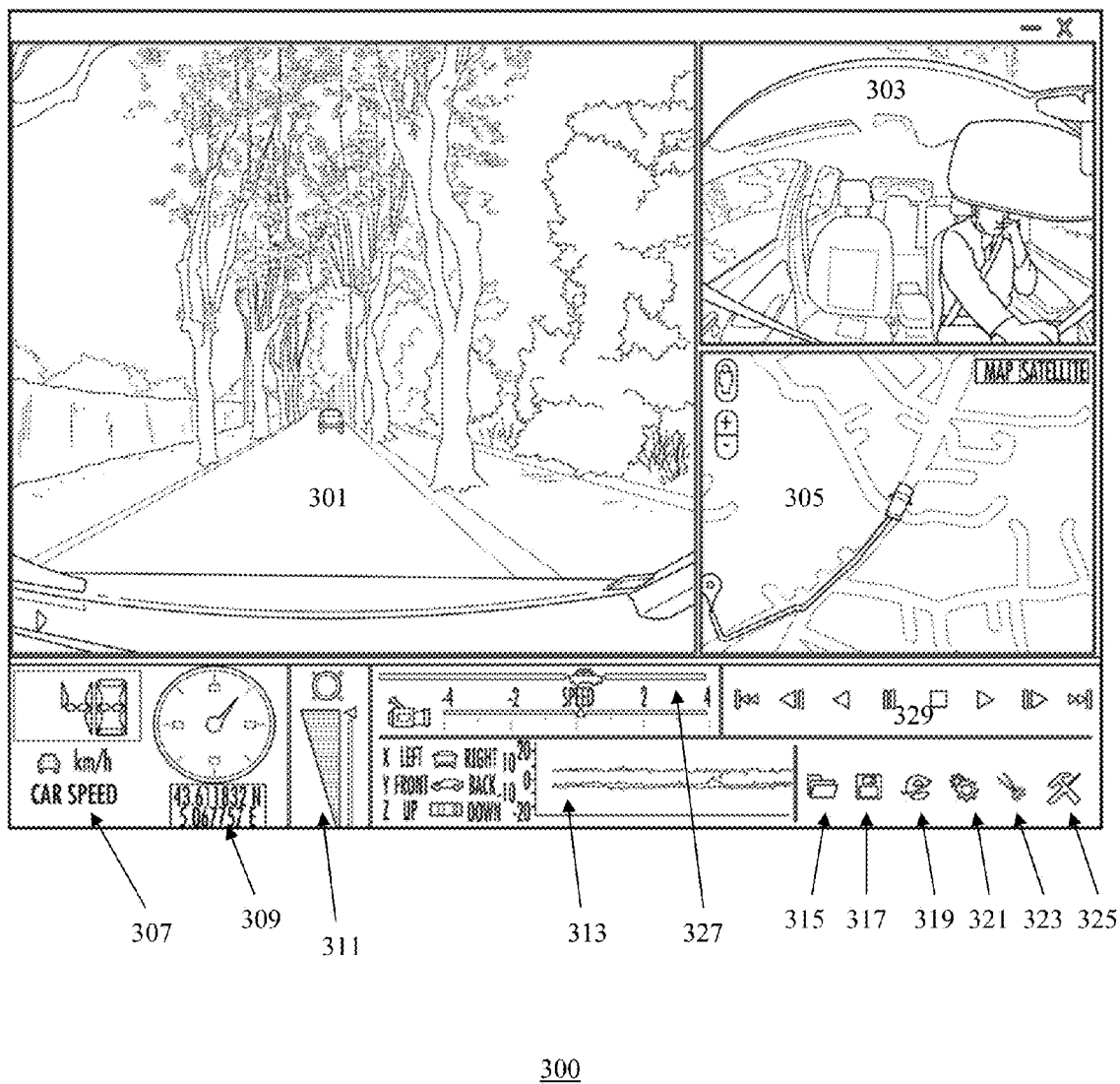
FIG. 3 shows a user interface screenshot which may be utilized by a driver or a vehicle monitoring personnel operating a computer server, in accordance with an embodiment of the invention.

FIG. 3 shows a user interface screenshot (300) which may be utilized by a driver or a vehicle monitoring personnel operating a computer server, in accordance with an embodiment of the invention. In one embodiment of the invention, the user interface screenshot (300) is a snapshot of a display screen from a driver's user interface device or a vehicle monitoring personnel's display screen connected to a computer server. The display screen of the driver's user interface device or the vehicle monitoring personnel's display screen may be a touch screen display or a non-touch screen display. Furthermore, in one embodiment of the invention, the driver's user interface device may require entry of a password or a personal identification number (PIN) for granting or denying access to a privacy-adjustable dataset access request by the computer server operated by the vehicle monitoring personnel.

A variety of vehicle-related information can be collected, recorded, and stored in a local storage of a privacy control-adjustable onboard vehicle monitoring device, and then selectively and wirelessly transmitted to a computer server operated by the vehicle monitoring personnel that receives the variety of vehicle-related information. As explained previously in association with FIG. 1 and FIG. 2, the variety of vehicle-related information may be categorized as a "vehicle information dataset," which comprises a "mandatory disclosure dataset" and a "privacy-adjustable dataset."

As shown in FIG. 3, in one embodiment of the invention, the driver's user interface device and/or the vehicle monitoring personnel's computer server can record and display a front windshield view (301) from a front windshield camera, a vehicle cabin view (303) from a cabin camera, and a GPS and map view (305) associated with GPS coordinates and underlying map data. Furthermore, the driver's user interface device and/or the vehicle monitoring personnel's computer server can also record and display sensory information such as a speedometer (307), compass coordinates (309), and an accelerometer reading (313). In a preferred embodiment of the invention, the speedometer (307) may derive its speed information based on changes of GPS coordinates relative to time that are derived from the GPS receiver chipset, or simply read a speedometer output from a vehicle's onboard electronic device. The compass coordinates (309) may also be derived from the GPS coordinates from the GPS receiver chipset, or be simply recorded from the vehicle's onboard electronic device.

Furthermore, in the embodiment of the invention as shown in FIG. 3, a three-axis accelerometer sensor may be embedded in a vehicle to generate three-axis (i.e. X, Y, Z) accelerometer readings for the vehicle, as displayed by the accelerometer reading display (313). In a preferred embodiment of the invention, the three-axis accelerometer sensor is a micro electromechanical system (MEMS) device that measures the vehicle's "g-force" or acceleration in various directions during driving. In one embodiment of the invention, the driver's user interface device and/or the vehicle monitoring personnel's computer server can record and display various sensor-based readings, such as speed, compass coordinates, and accelerometer values, in addition to the visual and/or the auditory recordings associated with the front windshield view (301) and the vehicle cabin view (303). Furthermore, GPS coordinates for a current location of the vehicle can be displayed in association with an underlying map data, as shown in the GPS and map view using a vehicle monitoring application program (e.g. 229 of FIG. 2) executed in the driver's user interface device or the computer server operated by the vehicle monitoring personnel.

Furthermore, as shown by FIG. 3, in one embodiment of the invention, the driver's user interface device and/or the vehicle monitoring personnel's computer server can also display an audio speaker volume control (311), and also replay the stored information using a playback interface (329) and a playback speed control (327). In the particular screenshot (300) as shown in FIG. 3, an "open folder" button (315), a "save file" button (317), "a web browser access" button (319), a "settings control" button (321), an "information cut" button (323), and a "close application" button (325) are also provided by the driver's user interface or the vehicle monitoring personnel's user interface to access, store, and control the recorded information, which originates from the privacy control adjustable onboard vehicle monitoring device installed in the vehicle.

Figure 4:
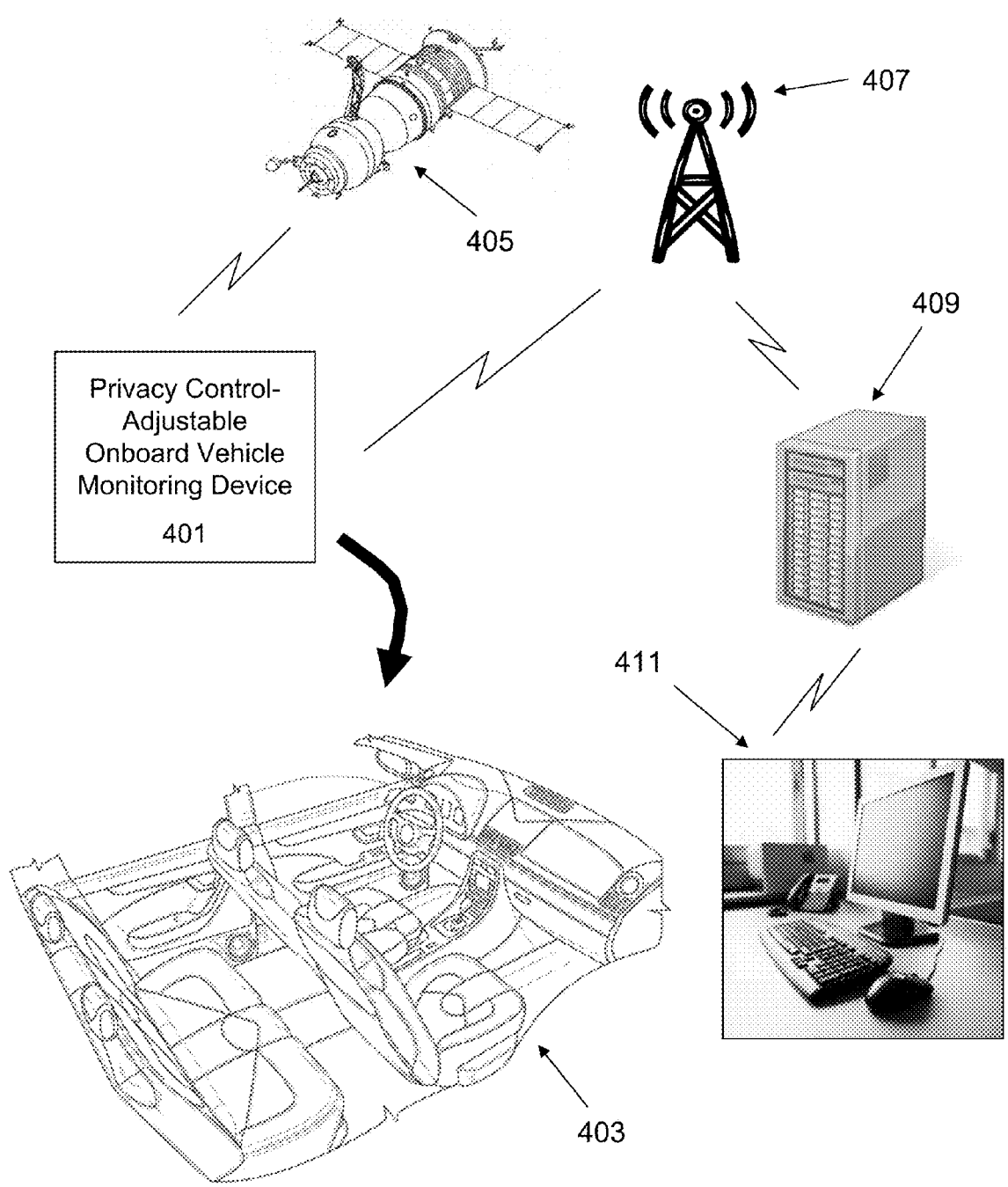
FIG. 4 shows an overall system block diagram of a privacy control-adjustable vehicle monitoring system with a wild card mode, in accordance with an embodiment of the invention.

FIG. 4 shows an overall system block diagram (400) of a privacy control-adjustable vehicle monitoring system with a wild card mode, in accordance with an embodiment of the invention. In a preferred embodiment of the invention, the privacy control-adjustable vehicle monitoring system with the wild card mode comprises a privacy control-adjustable onboard vehicle monitoring device (401) installed in a vehicle (403), a vehicle information dataset comprising a mandatory disclosure dataset and a privacy-adjustable dataset that are recorded by the privacy control-adjustable onboard vehicle monitoring device (401), a wireless transceiver unit either integrated into or operatively connected to the privacy control-adjustable onboard vehicle monitoring device (401), a wireless data communication network (407), a computer server (409) operated by a vehicle monitoring personnel, a vehicle monitoring software module (e.g. 229 of FIG. 2) executed on the computer server (409), and a vehicle monitoring personnel's user interface device (411).

In addition, in one embodiment of the invention, the privacy control-adjustable vehicle monitoring system may also include a satellite communication network (405), as shown in FIG. 4. Furthermore, the privacy control-adjustable vehicle monitoring system may also include a driver's user interface device, such as an onboard vehicle user interface device or a mobile electronic device, which is configured to receive, grant, or deny a privacy-adjustable data access request by the computer server (409) operated by the vehicle monitoring personnel.

In the preferred embodiment of the invention, the privacy control-adjustable onboard vehicle monitoring device (401) is capable of storing the vehicle information dataset collected from a vehicle's onboard computer or another vehicle-attached equipment. Furthermore, the wireless transceiver unit either integrated into or operatively connected to the privacy control-adjustable onboard vehicle monitoring device (401) is capable of transmitting at least a portion of the vehicle information dataset from the privacy control-adjustable onboard vehicle monitoring device (401) to the computer server (409) operated by the vehicle monitoring personnel. In addition, in one embodiment of the invention, the vehicle monitoring software module (e.g. 229 of FIG. 2) is executed on a CPU and a memory unit of the computer server (409), and includes a mandatory disclosure dataset monitoring sub-module, a privacy-adjustable dataset monitoring sub-module, a privacy-adjustable dataset access request sub-module, and a wild card information sub-module, as previously described in association with FIG. 2.

Figure 5:
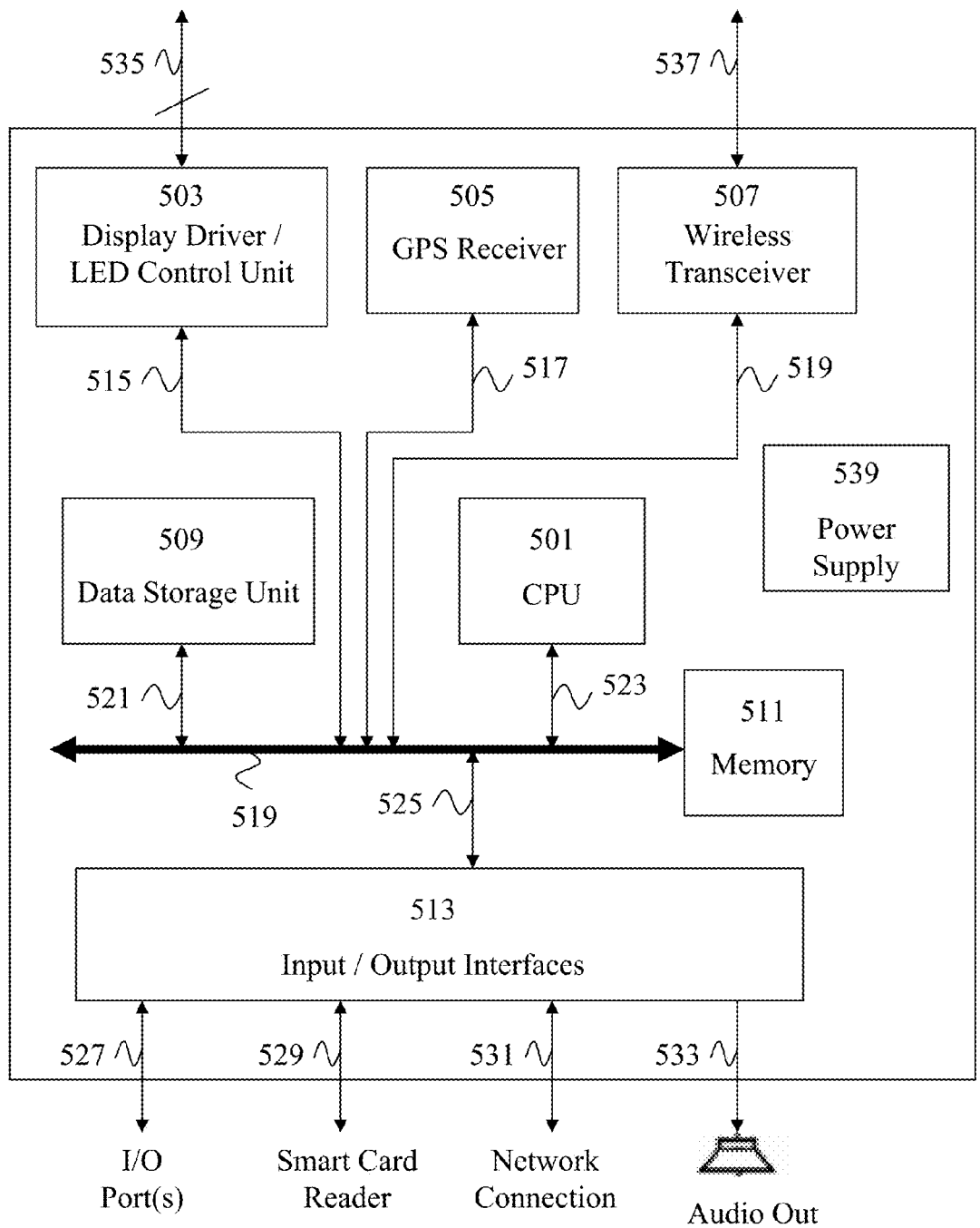
FIG. 5 shows a block diagram example for a privacy control-adjustable onboard vehicle monitoring device with a wild card mode, in accordance with an embodiment of the invention.

FIG. 5 shows a device block diagram example (500) for a privacy control-adjustable onboard vehicle monitoring device with a wild card mode, in accordance with an embodiment of the invention. In one embodiment of the invention, the privacy control-adjustable onboard vehicle monitoring device comprises a central processing unit (CPU) (501), a memory unit (511), a data storage unit (509), a display driver and light indicator control unit (503), a GPS receiver unit (505), and a wireless transceiver unit (507). In this embodiment of the invention, the CPU (501) is operatively connected (i.e. 523) to other functional logic blocks (e.g. 503, 505, 507, 509, 511, 513, and etc.) via a data communication bus (519), and controls behaviors and actions of other functional logic blocks.

Furthermore, in this embodiment of the invention, the memory unit (511) is a dynamic random access memory (DRAM) unit, a non-volatile memory unit such as a Flash memory unit, or a combination of both, wherein the memory unit (511) is configured to load data and instructions from the CPU (501) and the data storage unit (509). In addition, the data storage unit (509) is a hard disk drive, a non-volatile memory unit such as a Flash memory unit, or another data storage device operatively connected (i.e. 521) to other functional logic blocks via the data communication bus (519). In one embodiment of the invention, the data storage unit (509) is configured to store data and retain its stored data integrity even when the electrical power is no longer supplied to the privacy control-adjustable onboard vehicle monitoring device.

Moreover, in the embodiment of the invention with the device block diagram example (500) for the privacy control-adjustable onboard vehicle monitoring device as shown in FIG. 5, the display driver and light indicator control unit (503) is configured to drive a display screen (e.g. an LCD screen, one or more LED indicators, and etc.) operatively connected (i.e. 535) to the device block diagram (500). In general, driving the display screen involves providing and refreshing display-related data to the display screen. The display driver and light indicator control unit (503) is operatively connected (i.e. 515) to the data communication bus (519), and this unit's actions and behaviors can be ultimately controlled by the CPU (501).

Continuing with FIG. 5, in one embodiment of the invention, the GPS receiver (505) is configured to receive GPS location signals and at least partially demodulate or process the received GPS location signals for use by other functional logic blocks in the device block diagram example (500). Any GPS location information derived from the received GPS location signals may be used for location and GPS coordinate broadcasting and other features incorporated in the privacy control-adjustable onboard vehicle monitoring device. In one embodiment of the invention, the GPS receiver (505) is operatively connected (i.e. 517) to the CPU (501) via the data communication bus (519).

Furthermore, in one embodiment of the invention, a wireless transceiver (507) is configured to transmit wireless signals to a wireless router and/or a base station. The wireless transceiver (507) is also configured to receive wireless signals from the wireless router and/or the base station. The wireless transceiver (507) is operatively connected (i.e. 519) to the CPU (501) via the data communication bus (519), wherein the CPU (501) controls and instructs the wireless transceiver (507) for transmission and reception of wireless signals. In one embodiment of the invention, the wireless transceiver (507) may also utilize a separate digital signal processing (DSP) unit which processes data packets for wireless transmission or reception according to a particular wireless protocol. In the preferred embodiment of the invention, the wireless transceiver (507) is designed for cellular network data transmission and reception. In another embodiment of the invention, the wireless transceiver (507) may also be designed for wireless local area networks (wireless LAN's), mobile broadband signals (e.g. WiMAX), personal area networks (e.g. NFC, Bluetooth), cellular signals, or a combination thereof. In the preferred embodiment of the invention, the wireless transceiver (507) is operatively connected to an RF antenna via an electrical connection (i.e. 537).

Moreover, in one embodiment of the invention, the device block diagram example (500) for the privacy control-adjustable onboard vehicle monitoring device also includes input/output (I/O) interfaces (513), which is operatively connected (i.e. 525) to the CPU (501) and other functional logic blocks of the device block diagram example (500) via the data communication bus (519). In one embodiment of the invention, the I/O interfaces (513) provide data, power, and/or other connections (i.e. 527, 529, 531, 533) to an I/O port (527), a smart card reader (529), a network connection interface (531), and an audio output port (533). In particular, the I/O interface (513) is preferably compatible to automotive diagnostic communication protocols, such as "SAE J1850 PWM," "SAE J1850 VPW," "ISO 9141-2," "ISO 14230-4," "ISO 15765-4," "J1939," and "J1708," most of which may be based on the "OBDII" protocol standard. In a preferred embodiment of the invention, many of the OBDII-based outputs from vehicle diagnostic modules or chips may be part of a mandatory disclosure dataset (e.g. 101 and 103 of FIG. 1). For example, many of the vehicle diagnostics, trouble codes, and vehicle safety alert information (e.g. 103 of FIG. 1) may originate from the OBDII-based outputs from the vehicle diagnostic modules or chips, which are operatively connected to the I/O interfaces (513) of the privacy control-adjustable onboard vehicle monitoring device.

Furthermore, a power supply unit (539) is operatively connected to the CPU (501) and other functional logic blocks of the device block diagram example (500) for the privacy control-adjustable onboard vehicle monitoring device, wherein the power supply unit (539) receives electrical power from a battery or another electrical power source, and provides electrical power to the CPU (501) and other functional logic blocks in the privacy control-adjustable onboard vehicle monitoring device.

Figure 6:
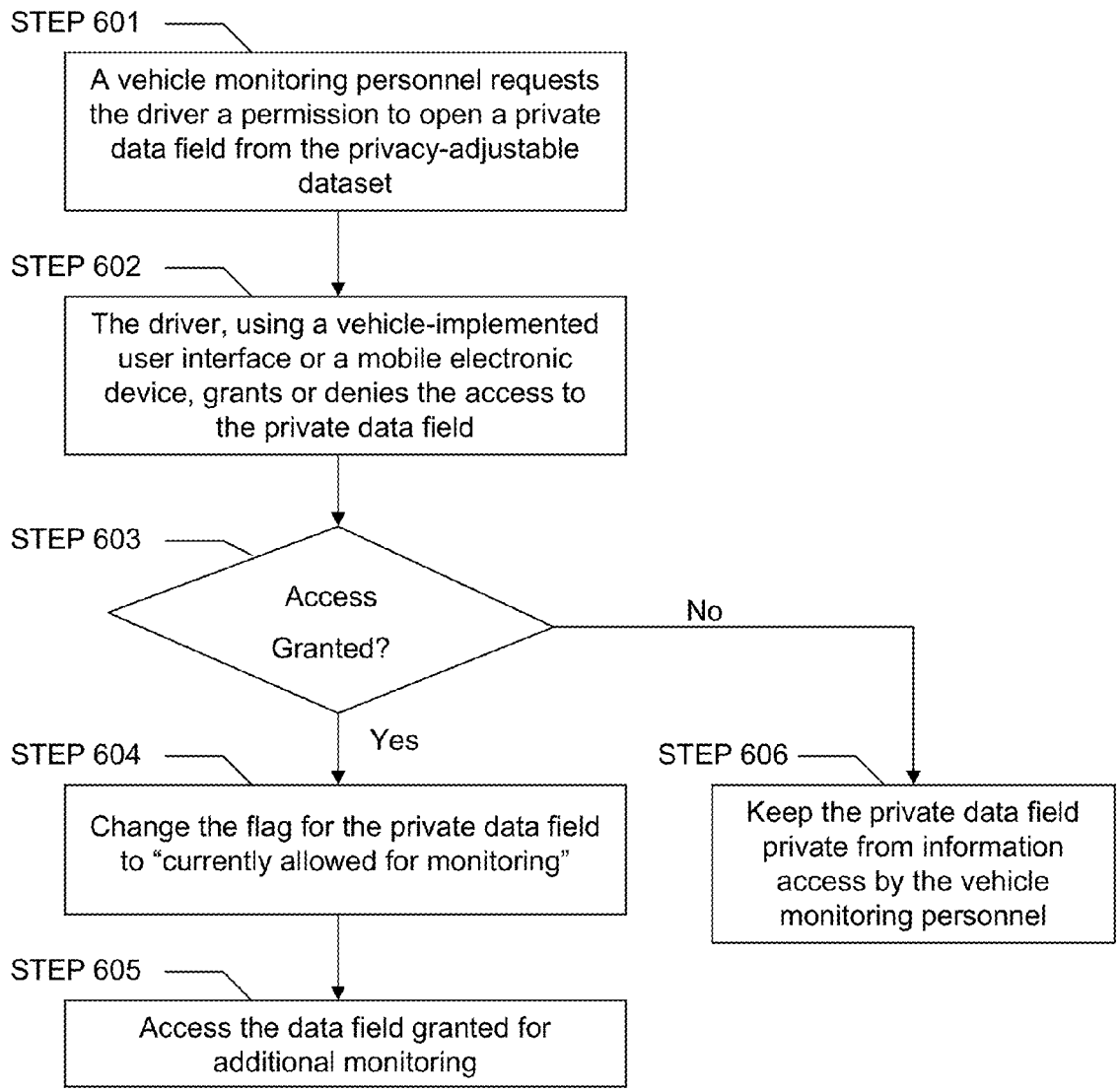
FIG. 6 shows a method of privacy control-adjustment between a vehicle monitoring personnel and a driver's user interface, in accordance with an embodiment of the invention.

FIG. 6 shows a method (600) of privacy control-adjustment between a vehicle monitoring personnel and a driver's user interface, in accordance with an embodiment of the invention. As shown in STEP 601, in one embodiment of the invention, a vehicle monitoring personnel requests the driver's user interface a permission to open a private data field from a privacy-adjustable dataset. For example, a computer server operated by the vehicle monitoring personnel can initiate transmission of a permission request to a driver's user interface device for requesting access to a private data field in a privacy-adjustable dataset of a vehicle information dataset, which is stored in a privacy control-adjustable onboard vehicle monitoring device. The permission request from the computer server is typically wirelessly transmitted by a wireless data network.

Then, as shown in STEP 602, the driver can use the driver's user interface device, which may be a vehicle-implemented user interface or a mobile electronic device, to grant or deny the access to the private data field. Preferably, the driver's user interface device generates a response signal, which is wirelessly transmitted to the computer server via a wireless data network.

Once the computer server operated by the vehicle monitoring personnel receives the response signal, the computer server can check whether the response signal indicates that the access to the private data field is granted or not, as shown in STEP 603. If the access to the private data field is granted, then the computer server can change a data access flag for the private data field to "additional monitoring allowed" or "currently allowed for monitoring," as shown in STEP 604. Then, the computer server can access the private data field for additional monitoring by the vehicle monitoring personnel, as shown in STEP 605.

On the other hand, if the response signal from the driver's user interface device indicates that the access to the private data field is denied, then the private data field stored in the privacy control-adjustable onboard vehicle monitoring device is restricted from being accessed by the computer server operated by the vehicle monitoring personnel, as shown in STEP 606.

Figure 7:
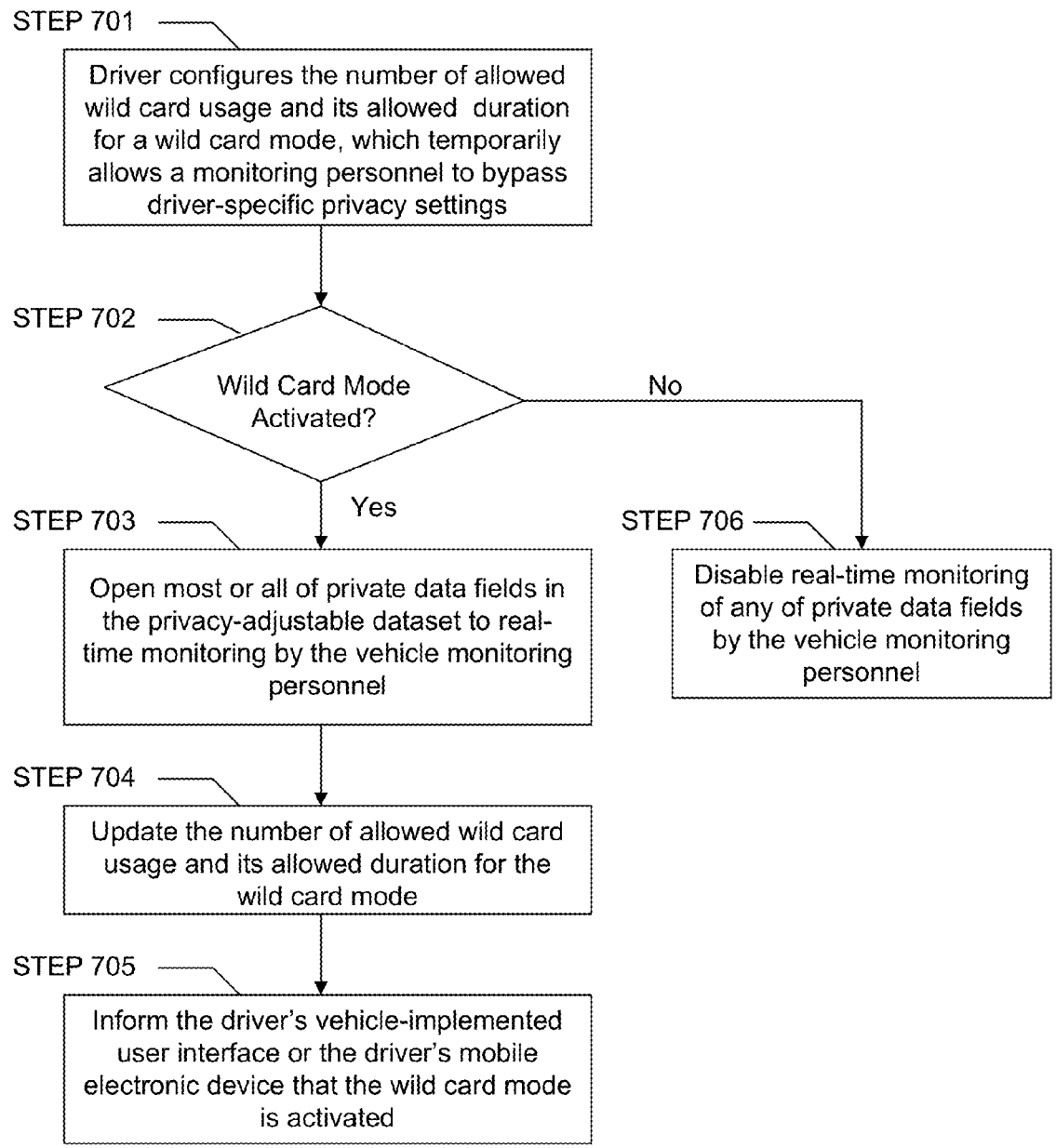
FIG. 7 shows a method of a wild card operation between a vehicle monitoring personnel and a driver's user interface, in accordance with an embodiment of the invention.

FIG. 7 shows a method (700) of a wild card operation between a vehicle monitoring personnel and a driver's user interface, in accordance with an embodiment of the invention. As shown in STEP 701, a driver can configure an allowed number of wild card usages and its duration for a specific time period (e.g. per day, per week, per month, and etc.) by a vehicle monitoring personnel. A wild card mode temporarily enables the vehicle monitoring personnel to bypass the driver-specific privacy settings in order to access a mandatory disclosure dataset as well as a privacy-adjustable dataset. In particular, the driver can select a number of allowed wild card usage and a duration of each wild card usage for the wild card mode as an electronic consent with the vehicle monitoring personnel's computer server from the driver's user interface device. In general, the wild card mode in accordance with an embodiment of the invention is designed to be invoked only in case of emergency or in case of an urgent need to access an entire set of vehicle-related information for safety or urgent business reasons.

Then, as shown in STEP 702, if the wild card mode is activated by the vehicle monitoring personnel's computer server in accordance with the electronic consent, the vehicle monitoring personnel's computer server can open most or all of private data fields in the privacy-adjustable dataset in the privacy control-adjustable onboard vehicle monitoring device to real-time monitoring, as shown in STEP 703. Then, the vehicle monitoring personnel's computer server can also update the number of allowed wild card usage and the duration of each wild card usage for the wild card mode, as shown in STEP 704. Furthermore, as shown in STEP 705, the vehicle monitoring personnel's computer server can also inform the driver's user interface device that the wild card mode is currently activated.

On the other hand, if the wild card mode is not activated due to restrictions associated with the electronic consent, as also shown in STEP 702, then the vehicle monitoring personnel's computer server is restricted from accessing any private data fields in the privacy control-adjustable onboard vehicle monitoring device, as shown in STEP 706.

Various embodiments of the present invention provide several key advantages to drivers, vehicle monitoring service providers, and supervising entities for vehicles, such as parents and commercial vehicle operators for a finer balance of privacy protection and vehicle monitoring needs. For example, an advantage of an embodiment of the present invention is providing a novel privacy control-adjustable vehicle monitoring system that involves an explicit real-time consent from a driver to a vehicle monitoring personnel or a supervising entity to grant or deny access to certain types of datasets collected in an onboard vehicle monitoring device. This unique privacy control-adjustable vehicle monitoring system provides a fine balance between a driver's desire for protecting some personally-sensitive information from real-time vehicle monitoring, and a monitoring personnel's intention of observing critical vehicle information without being overly intrusive to the driver.

Another advantage of an embodiment of the present invention is providing a novel dataset categorization for vehicle monitoring systems to separate a "must-disclose" mandatory dataset from a privacy-adjustable dataset for various data fields collected by the onboard vehicle monitoring device for the driver's privacy protection. This separation of datasets enable the privacy control-adjustable vehicle monitoring system of the present invention to keep the privacy-adjustable dataset genuinely private from unauthorized access attempts from the vehicle monitoring personnel or a rogue entity.

Furthermore, another advantage of an embodiment of the present invention is providing one or more flexible user interfaces that enable a driver to grant or deny access to privacy-adjustable datasets associated with the vehicle, whether the driver is currently inside or outside the vehicle. For example, the authorization to grant or deny access to the privacy-adjustable datasets can be made by an onboard vehicle user interface, or a mobile electronic device (e.g. a smart phone) that the driver carries outside the vehicle.

In addition, another advantage of an embodiment of the present invention is providing a novel wild card mode that grants a vehicle monitoring personnel or a supervising entity a time-limited and frequency-limited access to currently-private datasets based on an explicit pre-arranged agreement with a driver.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A privacy control-adjustable vehicle monitoring system with a wild card mode, the privacy control-adjustable vehicle monitoring system comprising:
  a privacy control-adjustable onboard vehicle monitoring device capable of storing a vehicle information dataset collected from a vehicle's onboard computer or another vehicle-attached equipment;
  a computer server with a CPU and a memory unit, wherein the computer server is operated by a vehicle monitoring personnel;
  a vehicle monitoring software module at least partially executed on the CPU and the memory unit of the computer server operated by the vehicle monitoring personnel, wherein the vehicle monitoring software module includes a mandatory disclosure dataset monitoring sub-module, a privacy-adjustable dataset monitoring sub-module, a privacy-adjustable dataset access request sub-module, and a wild card information sub-module;
  a wireless transceiver unit either integrated into or operatively connected to the privacy control-adjustable onboard vehicle monitoring device for transmission of at least a portion of the vehicle information dataset from the privacy control-adjustable onboard vehicle monitoring device to the computer server operated by the vehicle monitoring personnel;
  the vehicle information dataset comprising a mandatory disclosure dataset that includes wild card information, and a privacy-adjustable dataset, wherein the mandatory disclosure dataset is automatically and periodically transmitted to the computer server operated by the vehicle monitoring personnel, and wherein the privacy-adjustable dataset is not transmitted to the computer server, unless the privacy-adjustable dataset is currently flagged by a driver to grant access to the vehicle monitoring personnel; and
  a driver's user interface device configured to receive, grant, or deny a privacy-adjustable data access request by the computer server operated by the vehicle monitoring personnel.

2. The privacy control-adjustable vehicle monitoring system of claim 1, further comprising at least one of a satellite communication network and a cellular communication network for transmission of at least a portion of the vehicle information dataset from the privacy control-adjustable onboard vehicle monitoring device to the computer server operated by the vehicle monitoring personnel.

3. The privacy control-adjustable vehicle monitoring system of claim 1, wherein the privacy control-adjustable onboard vehicle monitoring device includes a device CPU, a device memory unit, a display driver unit, a GPS receiver unit, a power supply unit, a data storage unit, and an input and output interface, which is compatible to communicate in a OBDII standard protocol with a vehicle diagnostic module or a vehicle diagnostic chip.

4. The privacy control-adjustable onboard vehicle monitoring device of claim 3, further comprising a touch screen display in the vehicle as the driver's user interface device.

5. The privacy control-adjustable vehicle monitoring system of claim 1, wherein the mandatory disclosure dataset comprises a first sub-dataset comprising vehicle diagnostics, trouble codes, and vehicle safety alert information, a second sub-dataset comprising device removal alarm information in case of rogue removal of the onboard vehicle monitoring device or an onboard diagnostic device, and a third sub-dataset comprising the wild card information.

6. The privacy control-adjustable vehicle monitoring system of claim 1, wherein the privacy-adjustable dataset comprises a first sub-dataset comprising vehicle speed, engine rotations per minute, fuel usage, and miles driven, a second sub-dataset comprising location and GPS coordinate broadcasting, a sub-third dataset comprising a location broadcasting timer, and a fourth sub-dataset comprising other personally-sensitive information specified by the driver.

7. The privacy control-adjustable vehicle monitoring system of claim 6, wherein another vehicle-attached equipment is at least one of a digital video recorder and an audio recorder with a microphone, and wherein the other personally-sensitive information specified by the driver is a video or audio footage from the vehicle.

8. The privacy control-adjustable vehicle monitoring system of claim 1, wherein the driver's user interface device is a smart phone or another mobile electronic device which executes a mobile application program for receiving, granting, or denying the privacy-adjustable dataset access request by the computer server operated by the vehicle monitoring personnel.

9. The privacy control-adjustable vehicle monitoring system of claim 1, wherein the computer server operated by the vehicle monitoring personnel is operatively connected to a display screen and displays at least some of the vehicle information dataset on the display screen in real time.

10. The privacy control-adjustable vehicle monitoring system of claim 1, wherein the driver's user interface device requires entry of a password or a personal identification number (PIN) for granting or denying access to the privacy-adjustable dataset access request by the computer server operated by the vehicle monitoring personnel.

11. The privacy control-adjustable vehicle monitoring system of claim 1, wherein the computer server operated by the vehicle monitoring personnel with an electronic consent from the driver's user interface is capable of changing a data access flag of a private data field in the privacy-adjustable dataset from "private" to "monitoring allowed."

12. A method of operating a privacy control-adjustable vehicle monitoring system for a particular privacy control adjustment in a vehicle, the method comprising steps of:
  transmitting a permission request from a computer server operated by a vehicle monitoring personnel to a driver's user interface device for requesting access to a private data field in a privacy-adjustable dataset of a vehicle information dataset, wherein the vehicle information dataset comprises a mandatory disclosure dataset that includes wild card information, and the privacy-adjustable dataset that includes the private data field, wherein the permission request is transmitted by a wireless data network;
  granting or denying the permission request using the driver's user interface device, which wirelessly transmits a response signal to the computer server via the wireless data network for granting or denying access to the private data field;

receiving the response signal in the computer server operated by the vehicle monitoring personnel; and if the response signal grants the access to the private data field:

changing a data access flag for the private data field to additional monitoring allowed; and accessing the private data field, which is now allowed for additional monitoring by the computer server operated by the vehicle monitoring personnel;

else if the response signal denies the access to the private data field:

keeping the private data field private from information access by the computer server operated by the vehicle monitoring personnel.

13. The method of claim 12, wherein the computer server operated by the vehicle monitoring personnel executes a vehicle monitoring software module in a CPU and a memory unit of the computer server.

14. The method of claim 13, wherein the vehicle monitoring software module includes a mandatory disclosure dataset monitoring sub-module, a privacy-adjustable dataset monitoring sub-module, a privacy-adjustable dataset access request sub-module, and a wild card information sub-module.

15. The method of claim 12, wherein the wireless data network is at least one of a cellular communication network and a satellite communication network.

16. The method of claim 12, wherein the driver's user interface device is an onboard vehicle user interface device or an mobile electronic device.

17. A method of operating a wild card mode in a privacy control-adjustable vehicle monitoring system between a vehicle monitoring personnel's computer server and a driver's user interface device, the method comprising steps of:

selecting a number of allowed wild card usage and a duration of each wild card usage for the wild card mode as an electronic consent with the vehicle monitoring personnel's computer server from the driver's user interface device, wherein the wild card mode temporarily allows the vehicle monitoring personnel's computer server to bypass driver-specific privacy settings to access all of a vehicle information dataset, including a mandatory disclosure dataset and a privacy-adjustable dataset, from a privacy control-adjustable onboard vehicle monitoring device;

if the wild card mode is activated by the vehicle monitoring personnel's computer server in accordance with the electronic consent:

opening most or all of private data fields in the privacy-adjustable dataset in the privacy control-adjustable onboard vehicle monitoring device to real-time monitoring by the vehicle monitoring personnel's computer server;

updating the number of allowed wild card usage and the duration of each wild card usage for the wild card mode; and informing the driver's user interface device that the wild card mode is currently activated;

else if the wild card mode is not activated due to restrictions associated with the electronic consent:

disabling real-time monitoring of any private data fields by the vehicle monitoring personnel's computer server.

18. The method of claim 17, wherein the vehicle monitoring personnel's computer server executes a vehicle monitoring software module in its CPU and its memory unit, and wherein the driver's user interface device is an onboard vehicle user interface device or an mobile electronic device.

19. The method of claim 18, wherein the vehicle monitoring software module includes a mandatory disclosure dataset monitoring sub-module, a privacy-adjustable dataset monitoring sub-module, a privacy-adjustable dataset access request sub-module, and a wild card information sub-module.

* * * * *